No. 828,139. PATENTED AUG. 7, 1906.
C. T. OWENS.
ANIMAL TRAP.
APPLICATION FILED FEB. 6, 1906.
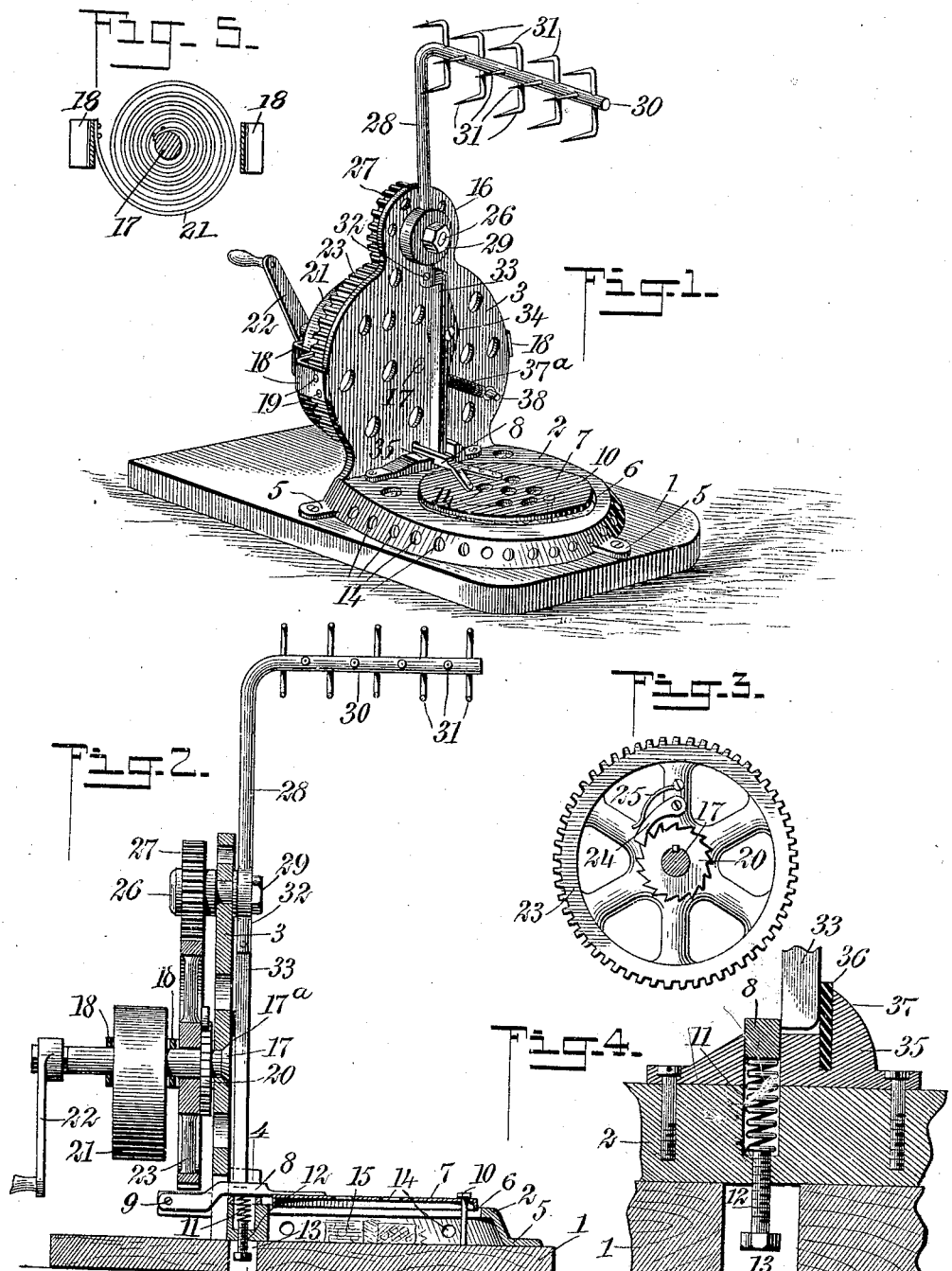
INVENTOR
Charles Thompson Owens
BY
ATTORNEYS

UNITED STATES PATENT OFFICE.

CHARLES THOMPSON OWENS, OF HOMINY, OKLAHOMA TERRITORY.

ANIMAL-TRAP.

No. 828,139.   Specification of Letters Patent.   Patented Aug. 7, 1906.

Application filed February 6, 1906. Serial No. 299,728.

*To all whom it may concern:*

Be it known that I, CHARLES THOMPSON OWENS, a citizen of the United States, and a resident of Hominy, Osage Nation, Oklahoma Territory, have invented a new and Improved Animal-Trap, of which the following is a full, clear, and exact description.

My invention relates to improvements in animal-traps, and in particular to a self-setting automatic trap which is designed to kill undesirable animals — such as mice, rats, wolves, &c.—according to the size of the device.

The object of my invention is to provide a device of this character at a small cost which will be simple and reliable in construction and which may be set in any desired locality to kill the animal which is attracted by the bait contained therein and thereafter to quickly remove the dead animal a sufficient distance to prevent any interference with the subsequent operation of the device.

A further object of my invention is to produce a reliable device of this character which after each operation thereof to kill any animal will automatically reset itself and will thus be effective to kill a large number of animals without any attendance whatever until the power-supplying mechanism is exhausted, when it will be merely necessary to supply the device with additional power, such as the winding of a spring.

With the above-mentioned and other objects in view I have shown in the accompanying drawings the construction of a device embodying the principles of my invention and in which similar characters of reference indicate corresponding parts in all the figures.

Figure 1 is a perspective view of a form of my device when set and ready for operation. Fig. 2 is a vertical longitudinal section showing certain parts in elevation. Fig. 3 is an elevation of the operating-gear with its ratchet-and-pawl mechanism; and Fig. 4 is a fragmentary section on the line 4 4 of Fig. 2, but on an enlarged scale. Fig. 5 is a section through the spring 21.

Referring to the drawings in detail, 1 represents a convenient support, such as a board, to which the device may be secured, if desired, as hereinafter described. The frame of the device consists, preferably, of two rigid plates 2 and 3, formed at substantially right angles to each other, one being horizontal and the other vertical, as shown. The horizontal plate or base 2 is preferably oval in form and may have a beveled periphery and suitable lugs 5 for attachment by screws to the support 1. The base-plate 2 has a circular opening in which is loosely disposed a disk 7, which is rigidly secured to a lever 8, which is pivoted at a convenient point on an extension of the vertical plate 3, as shown at 9. This disk is the tread by which the animal trips the operating mechanism and is limited in its upward pivotal movement by a headed pin 10, against the head of which the tread is normally pressed by a spiral spring 11, the pressure of which is adjusted by a screw 12, an aperture 13 being provided in the board 1 for that purpose. The base 2 as well as the tread 7 are preferably formed with perforations 14 to lighten the structure and to aid the animal in smelling the bait 15, contained in the base 2. The vertical plate 3 is here shown as being of circular form with a circular extension 16 and may be constructed of any light strong material, preferably of an open-work construction, in order to decrease the weight thereof. A shaft 17 is journaled in the frame 3 and is provided with a beveled shoulder 17$^a$ and also with a metal strap or brace 18, which latter is secured to the frame by screws 19, and keyed to the shaft is a ratchet 20, which bears closely against the plate 3 to prevent any undue longitudinal play of the shaft. A steel spiral spring 21 has one end secured to the shaft 17, and its other end is secured to the metal strap 18, so that when the shaft is rotated by any convenient means, such as a crank 22, applied to the shaft, the spring 21 is put under tension. Mounted loosely upon the shaft 17, between the ratchet 20 and one branch of the strap 18, is a spur gear-wheel 23, which has pivoted thereon a pawl 24, pressed into coaction with the ratchet 20 by a spring 25.

Journaled in the extension 16 of the plate 3 is a second shaft 26, to which is keyed a spur-pinion 27, which is in mesh with the gear-wheel 23 and is of such a proportionate size that a rotation of the shaft 17 will produce a relatively much faster rotation of the shaft 26, as will be readily understood. To the shaft 26 is also rigidly secured an arm 28 by means of a nut 29, and this arm has a right-angular extension 30, provided with a plurality of sharp spikes 31, which are of extremely acute conical form, and there is also a short extension 32 on the opposite side of the shaft 26, which is adapted to come in contact with a trigger 33, which is pivoted at 34 to the plate 3.

Screwed to the base-plate is a trigger-plate 35, which may be provided with a leather cushion 36, held against the shoulder 37 on the trigger-plate, and said plate has a transverse groove in which the lever 8 has vertical play. The trigger 33 is retained in normal position against the cushion 36 by a spiral spring 37ª, one end of which is secured to said trigger and the other end to the plate 3 by means of a pin 38. When the lever 8 is in its normal raised position, it engages the lower end of the trigger and prevents the trigger from moving under the action of the spiked arm. When the lever is depressed by the weight of the animal on the trap, the lower end of the trigger is released and the spiked arm swings the trigger upon its pivot until the lower end of the spiked arm is released, after which the spring 37ª returns the trigger into position for engagement by the spiked arm when it has completed its revolution.

From the foregoing description the operation of my device will be easily understood. The crank 22 being rotated, the spring 21 is put under tension, while the ratchet 20 rotates with the shaft 17 without rotating the gear-wheel 23 by virtue of the well-known one-way idle action of the ratchet-and-pawl mechanism; but when the spring is put under the desired stress its tendency will be to unwind, and in order for the shaft 17 to rotate in the opposite direction the gear-wheel 23 must rotate therewith in view of the coaction of the spring-pressed pawl 24 carried thereby. This rotative tendency is communicated to the spur-pinion 27, shaft 26, and arms 28 and 30; but the rotation of the arms 28 and 30 is arrested by the arm 32 being in contact with one end of the trigger, and the other end of the trigger is locked by the slightly-raised lever 8, as is all clearly shown in Fig. 1. The trap is now set and ready for operation. It is obvious that when an animal in attempting to obtain the bait 15 presses down the tread 7 even a slight distance the trigger will be freed and allow the spiked arm 30 to sweep rapidly around with a forceful motion over and across the tread 7, thereby killing or wounding the animal. It is to be noticed that the spiked arm by virtue of its movement across the tread removes the animal from the same and allows the spring 11 to reset the lever 8, which will relock the trigger in the position shown in Fig. 4, as the trigger is instantly forced against the cushion 36 by its spring after the arm 32 has momentarily displaced it during the first part of the rotation of the arm 30. The animal will generally be retained by the sharp spikes and revolve therewith until the arm 30 is abruptly stopped by the automatic resetting of the machine, as described, when the animal will be thrown a considerable distance. The trap may be so placed that the animal after being engaged by the sharp spikes will be hurled into water or from a considerable height, if desired, in order to cause more certain death, and it is to be understood that my invention may be so proportioned in size that it will be adapted for use in exterminating different animals, such as mice, rats, wolves, &c.

Having thus described my invention, I claim as new and desire to secure by Letters Patent—

1. In an animal-trap, the combination with an L-shaped frame, of a pivotally-mounted treadle on one of the arms, a spring-actuated gear on the other arm, a shaft journaled in said last-named arm and actuated by the said gear, a spiked arm secured to the shaft and movable above the treadle, a trigger engaging the spiked arm and treadle for normally restraining the rotation of the shaft, and means whereby the weight of an animal upon the treadle will release the trigger.

2. In an animal-trap, the combination with the frame, of a pivotally-mounted treadle, a spring-actuated gearing, a shaft actuated by the gearing, a spiked arm secured to the shaft and movable above the treadle, a trigger engaging the spiked arm for normally restraining the movement thereof, and means whereby the weight of the animal on the treadle will release the trigger.

3. In an animal-trap, the combination with a spring-shaft, a gear element loosely mounted thereon, and having a pawl-and-ratchet engagement therewith, a pinion driven by the gear element, a spiked arm rigid with the pinion, means for normally restraining the rotation of the shaft and a treadle for releasing said restraining means.

4. In an animal-trap, the combination with a rotary gear mechanism, a spiked arm actuated thereby, a spring-pressed trigger for normally retaining the arm in fixed position, and a spring-pressed pivoted treadle for releasing the trigger, substantially as described.

5. In an animal-trap, the combination of a rotary gear mechanism, a revoluble spiked arm actuated thereby, a trigger normally restraining the movement of the arm, a pivotally-mounted treadle normally engaging the trigger, means whereby the weight of the animal upon the treadle will release the trigger, a spring for returning the treadle to its original position, and means for adjusting the tension of the spring.

In testimony whereof I have signed my name to this specification in the presence of two subscribing witnesses.

CHARLES THOMPSON OWENS.

Witnesses:
HOWARD M. MAHER,
PRENTISS PRICE.